United States Patent [19]

Takagi

[11] 3,873,118
[45] Mar. 25, 1975

[54] MANUAL CARRIER
[76] Inventor: Shozo Takagi, No. 6-4, 6-chome, Yamamoto-cho-minami, Yao-shi, Osaka, Japan
[22] Filed: May 31, 1974
[21] Appl. No.: 475,180

[30] Foreign Application Priority Data
May 31, 1973  Japan.............................. 48-64954

[52] U.S. Cl........... 280/47.2, 280/47.24, 280/47.27, 280/47.37, 280/79.1
[51] Int. Cl............................................ B62b 11/00
[58] Field of Search......... 280/36 R, 36 C, 41, 47.2, 280/47.24, 47.26, 30, 47.27, 47.37, 79.1

[56] References Cited
UNITED STATES PATENTS

| 343,890 | 6/1886 | Conn.......................... 280/47.2 UX |
| 2,598,168 | 5/1952 | Hooz et al......................... 280/36 R |
| 2,806,708 | 9/1957 | Finstad............................. 280/36 C |
| 3,104,889 | 9/1963 | Branch, Jr. ........................... 280/30 |

Primary Examiner—David Schonberg
Assistant Examiner—Michael J. Forman
Attorney, Agent, or Firm—Stewart and Kolasch, Ltd.

[57] ABSTRACT

In a manual carrier, a front wheel supporting U-shaped arm is pivotally mounted on the underside of the carrier table, and at one portion of said U-shaped arm a support arm is connected therewith. By extending said U-shaped arm, the carrier is used as a three-wheeled carrier and by adjusting said support arm the carrier table is convertible from an inclined position to a horizontal position or vice versa. Further, when said U-shaped arm is laid away, the carrier is used as a two-wheeled carrier.

5 Claims, 7 Drawing Figures

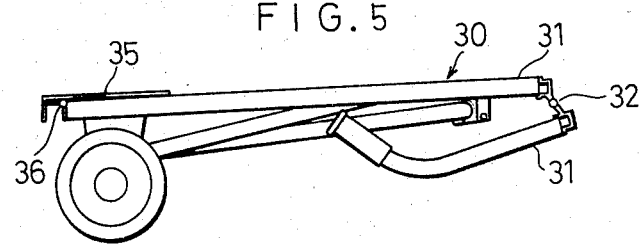
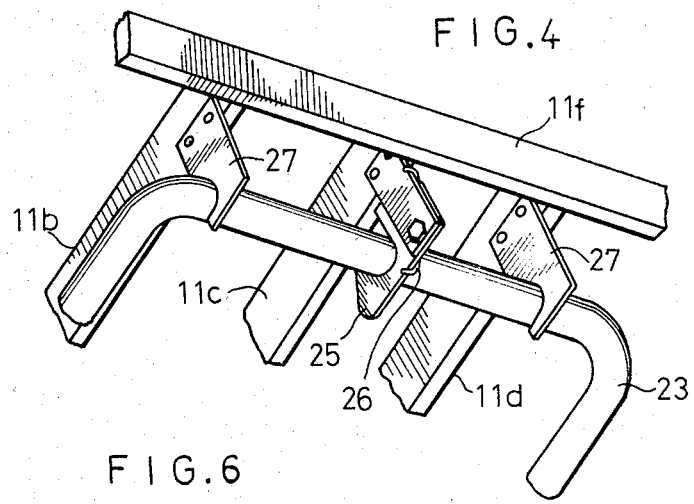
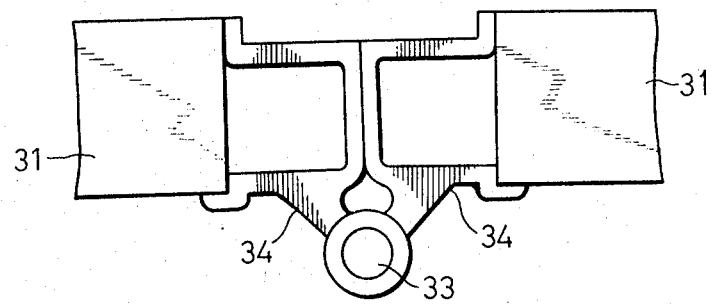
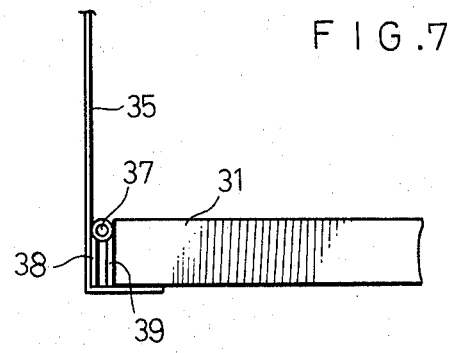

MANUAL CARRIER

BACKGROUND AND SUMMARY OF INVENTION

The present invention relates to a manual carrier, and more particularly to a carrier which can be used in the three ways. The carrier according to the present invention is convertible from a two-wheeled carrier into a three-wheeled carrier or vice versa and further its carrier table is adjustable from an inclined position into a horizontal position or vice versa, as occasion calls.

Hithertofore, two-wheeled manual carriers have been proposed for carrying light load, while three-wheeled or four-wheeled carriers have been provided for carrying heavy load. Since such conventional manual carriers have each of the wheels at fixed position, none of them are convertible from a two-wheeled type into another type or vice versa as occasion calls. Thus, the utility of the conventional manual carriers is limited to a small range and sometimes extra types of carriers are required for meeting the occasional purpose, which is uneconomical.

The present invention contemplates improvements over known types of manual carriers, in which the foregoing and other disadvantages are substantially overcome. According to the present invention, a U-shaped foldable arm is provided for support of a front wheel. Said arm is folded when the carrier is used as a two-wheeled carrier for conveying light load, while the same arm is designed so as to be pulled out when the carrier is used as a three-wheeled carrier for carrying heavy load. Further, a carrier table is adjustable from an inclined position into a horizontal position by means of a support arm when a big volume of load or many pieces of load are to be carried.

Therefore, it is an object of the present invention to provide an improved manual carrier usable in the three ways.

Another object of the invention is to provide a manual carrier which has a U-shaped foldable arm for supporting a front wheel.

A further object of the invention is to provide a manual carrier which has a carrier table adjustable from an inclined position into a horizontal position or vice versa by means of a support arm.

The above and other objects, features and advantages of the present invention will become more apparent from the following description of some of the preferred embodiments thereof taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is an enlarged partial perspective view showing the manner of engaging a support arm with holding hooks;

FIG. 5 is a modified embodiment according to the present invention wherein front portion of the carrier table and an end plate are designed so as to be foldable when not used;

FIG. 6 is an enlarged partial elevation of a hinge for use in said modified embodiment shown in FIG. 5; and FIG. 7 is an enlarged partial elevation of a foldable end plate employed in said modified embodiment shown in FIG. 5.

DESCRIPTION OF THE PREFERRED EMBODIMENTS

Figure 1:
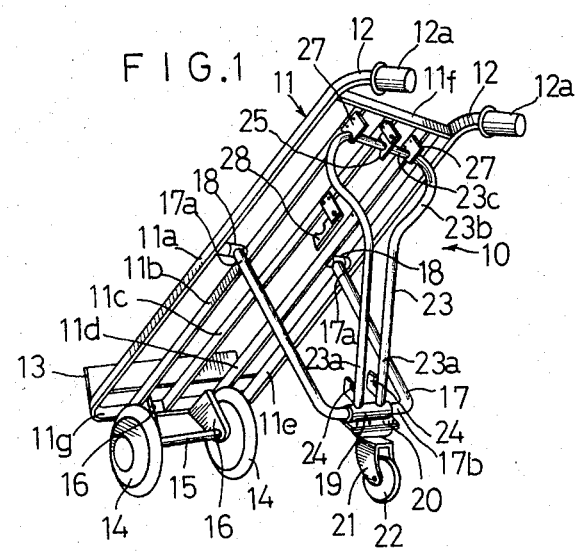
FIG. 1 is a perspective illustration of the preferred embodiment of the present invention used as a three-wheeled manual carrier with its table inclined.

Referring now by reference numeral to the drawings, and in particular to FIGS. 1 to 4 which illustrate the first embodiment of the instant invention. A manual carrier which is generally designated by reference numeral 10 has a carrier table 11 formed substantially rectangular. Said carrier table 11 is preferably constructed of at least five longitudinal metallic bars 11a, 11b, 11c, 11d and 11e which are axially arranged and spaced in parallel with each other, and a pair of end bars 11f and 11g which are arranged transversely with respect to said longitudinal bars. Of said longitudinal bars, each of outside bars 11a and 11e has an integral extension 12, on which a handle grip 12a is respectively mounted. At the rear end of said carrier table 11 there is provided an end plate 13 which is secured to the carrier table 11 by welding in order to prevent loaded materials from slipping down. Beneath the carrier table adjacent its rear end, a pair of rear wheels 14 are mounted on both ends of an axle 15 extending between a pair of conventional axle supports 16.

A U-shaped arm 17 is pivotally mounted beneath the carrier table 11, in the manner that both of its forked ends 17a are secured to a respective hollow shaft 18 inserted on a spindle (invisible in the drawings) transversely extending between the longitudinal bars 11a and 11b, and 11d and 11e, respectively. At a position 17b opposite to said forked ends 17a, a hollow tube 19 is mounted, through which said position 17b passes in the manner that the same position 17b is allowed to freely rotate about its longitudinal axis. At the underside of said hollow tube 19, a support plate 20 is secured by welding and a front wheel supporting bracket 21 is connected to said support plate 20 so that said bracket 21 can freely rotate about its vertical axis in the conventional manner. Thus, the front wheel 22 can serve as a steering means as well as a brake means.

While, there is provided a support arm 23 which has a pair of legs 23a and an eye portion 23b which includes a straight portion 23c extending substantially in parallel with the said end bar 11f. Said pair of legs 23a are fixed to said hollow tube 19 by welding. The whole length of the support arm 23 should be determined so that the same can be perpendicularly positioned when its straight portion 23c is engaged with hooks 25 and 27 to be described hereinafter. Adjacent to the each end of said legs 23a, an inwardly directed rest 24 is fixedly mounted thereon for the purpose described hereinafter.

As more particularly shown in detail in FIG. 4, a main hook 25 is secured by bolting or by welding to the underside of the center bar 11c adjacent to the front end of the carrier table 11. Said main hook 25 is preferably provided with a keep spring 26 for firmly grasping said straight portion 23c of the support arm 23. And preferably, a pair of auxiliary hooks 27 may be provided with each bars 11b and 11d flanking said center bar 11c, in the same manner as of said main hook 25. The auxiliary hooks 27 will do without any keep spring for economy as well as for easy operation. Further, as shown in FIG. 1, another hooks 28 is fixedly secured by bolting or by welding to the underside of said center bar 11c at a position where the hook 28 can hold said straight portion 23c of the support arm 23 when the same is folded. All of said hooks 25, 27 and 28 per se are well known. And, instead of said hook 28, a wire or other known fastening means may be replaceable.

Referring now to FIGS. 5 to 7 which illustrate the second embodiment of the present invention, wherein a manual carrier 30 is provided with a carrier table 31 which is designed so as to be folded in position by means of a hinge 32. Said hinge 32 has a hinge shaft 33 and a pair of hinge pieces 34 pivotally movable about said hinge shaft 33. Said hinge pieces 34 are fixedly connected to the facing ends of the carrier table 31, respectively. It is preferable that a suitable known locking device (not shown) for retaining said pair of hinge pieces together in order to keep the carrier table 31 extended during operation. Further, in this second embodiment, an end plate 35 is also designed so as to be foldable by means of a hinge 36 having a hinge shaft 37 and a pair of hinge plates 38 and 39 pivotally mounted about said hinge shaft 37. One of said hinge plates, viz. a plate 38 is fixedly connected to the end plate 35, while, the other hinge plate 39 is fixedly connected to the rear end of the carrier table 31. Thus, the end plate 35 is pivotally movable about the hinge shaft 37. The other parts of the manual carrier 30 in accordance with the second embodiment are substantially same as those of the first embodiment described in the foregoing.

Figure 2:
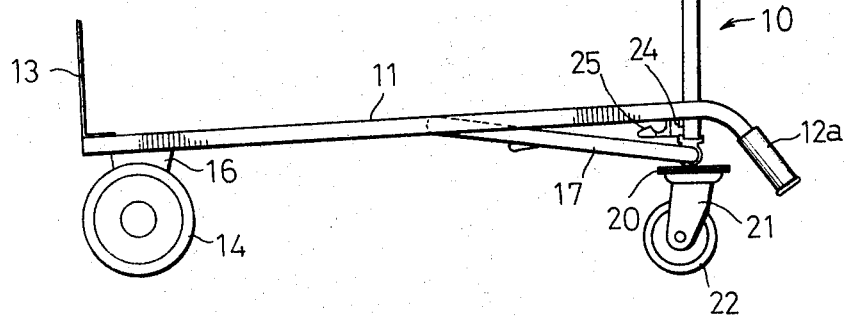
FIG. 2 is an enlarged elevation of the carrier shown in FIG. 1, used as a three-wheeled carrier with its table horizontally positioned.

In operation, when the manual carrier 10 is used as a three-wheeled carrier with its table inclined as shown in FIG. 1, an operator must pull out the U-shaped arm 17 and then force the straight portion 23c of the eye portion 23b of the support arm 23 into engagement with the main hook 25 as well as a pair of auxiliary hooks 27. Thus, a desired three-wheeled manual carrier with its carrier table inclined is provided. While, in the case the manual carrier 10 is to be used as a three-wheeled hand truck with a horizontal carrier table as shown in FIG. 2, the support arm 23 must be disengaged from said hook 25, 27, and the U-shaped arm 17 should be pivotted toward the front end of the carrier 10, and then the front bar 11f is put down on a pair of rests 24 provided respectively with the legs 23a of the support arm 23. Thus, a desired hand truck is obtained, wherein it should be noted that the support arm 23 serves as an operating handle.

Figure 3:
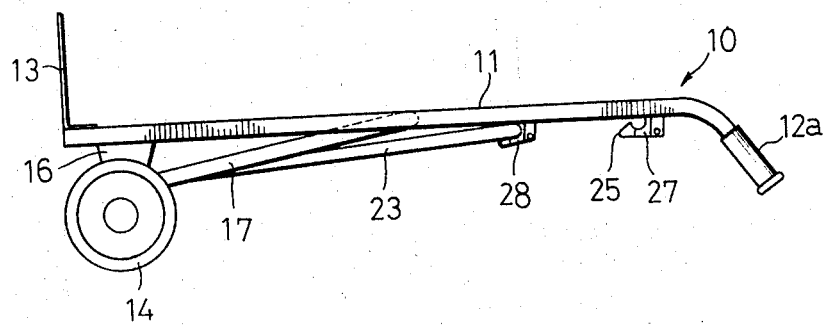
FIG. 3 is likewise an enlarged elevation of the carrier shown in FIG. 1 used as a two-wheeled carrier with its front wheel laid away.

On the other hand, when the manual carrier 10 is used as a two-wheeled carrier as shown in FIG. 3, the U-shaped arm 17 is pivotted in the direction of the rear end of the carrier, so that its front wheel 22 can be received within a space defined by the axle 15 and a pair of axle supports 16. while, the support arm 23, disengaged from the hooks 25 and 27 and then folded toward the rear end of the carrier 10, must be engaged with the hook 28. Thus, the desired two-wheeled manual carrier is available and the operator can operate the carrier by manipulating the handle grip 12a.

In operation of the manual carrier 30 according to the second embodiment of the invention, the operational manner is substantially the same as of the manual carrier 10 described in the foregoing. However, when not in use, the manual carrier 30 permits less volume since its carrier table 31 and end plate 35 are designed so as to be foldable.

The invention being thus described, it will be obvious that the same may be varied in many ways. Such variations are not to be regarded as a departure from the spirit and scope of the invention, and all such modifications are intended to be included within the scope of the appended claims.

I claim:

1. A manual carrier comprising
   a carrier table,
   a pair of operating handles extending forwardly from said carrier table,
   a pair of rear wheels provided under said carrier table,
   a U-shaped arm with a pair of forked ends pivotally connected to the underside of said carrier table,
   a hollow tube movably journalled to said U-shaped arm at a position opposite to said pair of forked ends of said U-shaped arm,
   a front wheel connected to said hollow tube through a bracket,
   a support arm having a pair of legs secured to a portion of said hollow tube opposite to said bracket,
   a pair of inwardly directed rests mounted on each of said pair of legs of said support arm adjacent to said hollow tube, respectively,
   said pair of rests being engageable with the front end of said carrier table when said U-shaped arm is pivotted toward the front end of said carrier table,
   said support arm substantially perpendicularly standing adjacent to the front end of said carrier table when said pair of rests are engaged with the front end of said carrier table,
   a first hook mounted on the lower side of the carrier table adjacent to the front end thereof,
   said first hook being engageable with said support arm at a position opposite to said pair of legs of the support arm when said U-shaped arm is extended in the direction substantially perpendicular to said carrier table,
   a second hook mounted on the lower side of said carrier table in axially spaced relation with said first hook, and
   said second hook being engageable with said support arm at a position opposite to said pair of legs of the support arm when said U-shaped arm and the support arm are folded together in the direction of the rear end of the carrier.

2. The manual carrier, as set forth in claim 1, wherein said carrier table is made of two pieces, and said two pieces of the carrier table are joined together by means of a hinge.

3. The manual carrier, as set forth in claim 1, wherein said carrier table is constructed of at least five spaced longitudinal metallic bars arranged in parallel with each other and at least a pair of end bars arranged transversely with respect to said longitudinal bars, the leftmost and the rightmost of said longitudinal bars being extending forwardly from the front end of said carrier table to form operating handles, said first hook is secured to the lower side of a center bar of said longitudinal bars at a position adjacent to the front end of said carrier table, said first hook has a keep spring for firmly grasping said support arm, a pair of third hooks are secured to each of the two longitudinal bars that flank said center bar, respectively, in line with said first hook, said second hook is secured to the lower side of said center bar, axially apart from said first hook, and an end plate is mounted on the rear end of said carrier table.

4. The manual carrier, as set forth in claim 3, which includes a pair of spindles extending transverse to said longitudinal bars and mounted between the leftmost longitudinal bar and another bar adjacent to said leftmost bar, and between the rightmost longitudinal bar and another bar next to said rightmost bar, respectively, a pair of hollow shafts freely mounted on each of said pair of spindles, respectively, and said forked ends of said U-shaped arm being connected to each ot said hollow shafts, respectively.

5. The manual carrier, as set forth in claim 3, wherein said end plate is connected to the rear end of said carrier table by means of a hinge.

* * * * *